(12) United States Patent
LaCrosse et al.

(10) Patent No.: US 10,207,938 B2
(45) Date of Patent: Feb. 19, 2019

(54) WATER COLUMN REMEDIATION APPARATUS

(71) Applicant: Opflex Technologies, LLC, Indianapolis, IN (US)

(72) Inventors: James E. LaCrosse, Indianapolis, IN (US); Scott C. Smith, Osterville, MA (US); Glenn G. Wattley, Osterville, MA (US)

(73) Assignee: OPFLEX TECHNOLOGIES, LLC, Indianapolis, IN (US)

( * ) Notice: Subject to any disclaimer, the term of this patent is extended or adjusted under 35 U.S.C. 154(b) by 284 days.

(21) Appl. No.: 14/954,793

(22) Filed: Nov. 30, 2015

(65) Prior Publication Data
US 2016/0152490 A1    Jun. 2, 2016

Related U.S. Application Data

(60) Provisional application No. 62/085,997, filed on Dec. 1, 2014.

(51) Int. Cl.
*C02F 1/28* (2006.01)
*C02F 1/40* (2006.01)
(Continued)

(52) U.S. Cl.
CPC ............ *C02F 1/40* (2013.01); *E02B 15/0842* (2013.01); *C02F 1/285* (2013.01); *C02F 2101/32* (2013.01);
(Continued)

(58) Field of Classification Search
CPC ........ C02F 1/285; C02F 1/40; C02F 2101/32; C02F 2103/007; E02B 15/045; E02B 15/0842; E02B 15/10; E02B 15/101
(Continued)

(56) References Cited

U.S. PATENT DOCUMENTS

| 3,702,657 A | 11/1972 | Cunningham et al. |
| 4,439,324 A | 3/1984 | Crotti |

(Continued)

FOREIGN PATENT DOCUMENTS

| KR | 10-2000-0000201 A | 1/2000 |
| KR | 10-2000-0024093 A | 5/2000 |

(Continued)

OTHER PUBLICATIONS

USA Today; Schmit, Julie; After BP oil spill, thousands of ideas poured in for cleanup; Nov. 15, 2010; 4 pages.

(Continued)

*Primary Examiner* — Matthew O Savage
(74) *Attorney, Agent, or Firm* — Bose McKinney & Evans, LLP

(57) ABSTRACT

An apparatus and method for capturing a contaminant present in a body of water that includes a collection media for capturing the contaminant and a structure. The collection media has a first end secured to the structure. The collection media has a second buoyant end disposed opposite the first end wherein buoyant end is a free end. The structure does not float at the water surface and holds the first end of the collection media below the buoyant second end in the water column. When the apparatus is deployed in a water column having a depth greater than the height of the apparatus, the apparatus is selectively positioned in the water column at a desired height. A method of employing the collection media is also disclosed.

12 Claims, 7 Drawing Sheets

(51) Int. Cl.
*E02B 15/04* (2006.01)
*E02B 15/08* (2006.01)
*C02F 101/32* (2006.01)
*C02F 103/00* (2006.01)
*E02B 15/10* (2006.01)

(52) U.S. Cl.
CPC ....... *C02F 2103/007* (2013.01); *E02B 15/045* (2013.01); *E02B 15/101* (2013.01)

(58) Field of Classification Search
USPC .............................................. 210/242.4, 924
See application file for complete search history.

(56) References Cited

U.S. PATENT DOCUMENTS

| | | | |
|---|---|---|---|
| 5,181,802 | A | 1/1993 | Thengs et al. |
| 5,229,006 | A | 7/1993 | Brinkley |
| 5,527,457 | A | 6/1996 | Holland |
| 5,885,451 | A | 3/1999 | Porrovecchio, Sr. |
| 7,399,411 | B2 | 7/2008 | DeAngelis |
| 8,557,121 | B1 | 10/2013 | Mendes |
| 8,721,220 | B2 | 5/2014 | Fore, III |
| 8,721,878 | B2 | 5/2014 | Shaw et al. |
| 8,853,289 | B2 | 10/2014 | Smith et al. |
| 8,968,570 | B2 | 3/2015 | Riedel |
| 2003/0222025 | A1 | 12/2003 | Archuleta |
| 2013/0087503 | A1* | 4/2013 | Youngs .............. B01D 39/1615 210/660 |
| 2013/0240451 | A1 | 9/2013 | Curtis, Jr. et al. |
| 2015/0315760 | A1 | 11/2015 | LaCrosse et al. |

FOREIGN PATENT DOCUMENTS

| | | |
|---|---|---|
| KR | 20-0316419 Y1 | 6/2003 |
| KR | 10-2007-0041085 A | 4/2007 |
| WO | WO 2013/164047 A1 | 11/2013 |
| WO | WO 2015/168633 A1 | 11/2015 |

OTHER PUBLICATIONS

Woods Hole Oceanographic Institution; Curtis, Thomas Gray, Jr.; Synthetic Eelgrass, Floating Sorbent Containment Boom; Jan. 3, 2013; 14 pages.

Woods Hole Oceanographic Institution; Williams, Albert J., 3rd, et al.; Oil Scavenging with Ethylene Methyl Acrylate; Unknown Date; 5 pages.

International Search Report and the Written Opinion of the International Searching Authority; PCT/US2015/063037, dated Mar. 23, 2016 (13 pages).

Extended European Search Report, EP 15865655.3, dated May 8, 2018, 7 pages.

* cited by examiner

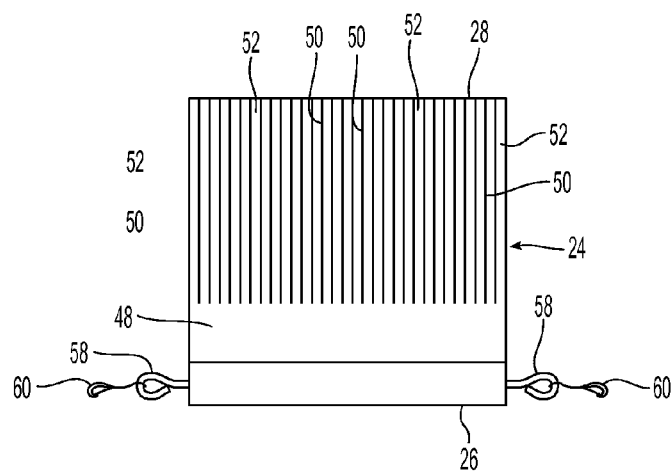
Fig. 8
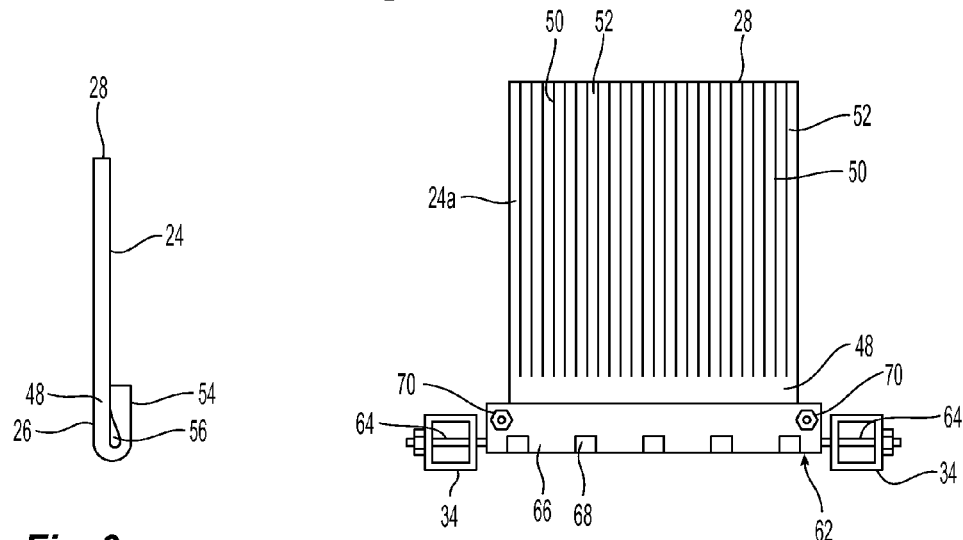
Fig. 9
Fig. 10
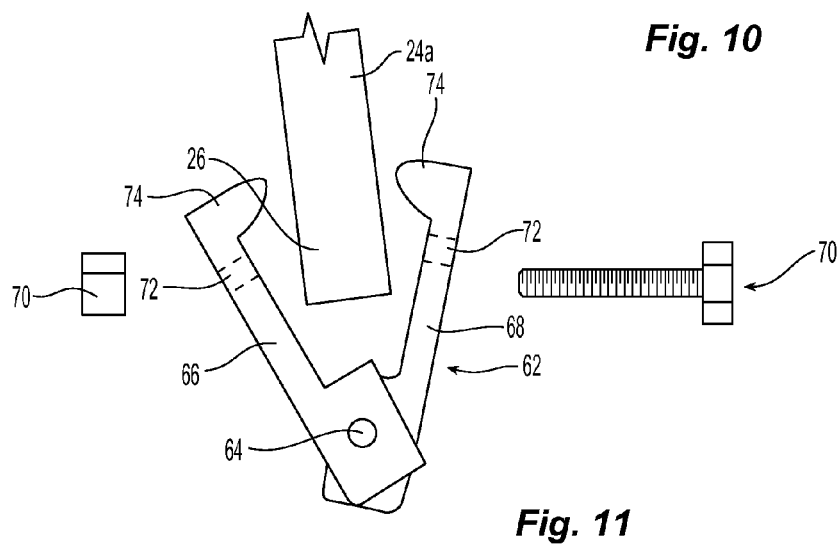
Fig. 11

WATER COLUMN REMEDIATION APPARATUS

CROSS REFERENCE TO RELATED APPLICATIONS

This application claims priority under 35 U.S.C. 119(e) of U.S. provisional patent application Ser. No. 62/085,997 filed on Dec. 1, 2014 entitled WATER COLUMN REMEDIATION APPARATUS AND METHOD the disclosure of which is hereby incorporated herein by reference.

BACKGROUND

The present disclosure relates to methods and apparatus for recovering contaminants from a body of water.

Liquid hydrocarbons, such as oil, are one of the most frequent contaminants that are the subject of clean-up efforts. Oftentimes, releases of such hydrocarbons take place on or near a body of water resulting in the necessity of recovering the hydrocarbons from the body of water. While the liquid hydrocarbons are often initially concentrated on the surface of the water, over time, the liquid hydrocarbons become emulsified and begin to sink becoming dispersed both over a larger area and vertically within the water column.

Skimmers, which vacuum the top layer of liquid on a water body, can be effective when the hydrocarbons are still highly concentrated at the upper surface of the water body but as the liquid hydrocarbons become dispersed different methods are necessary to reclaim the liquid hydrocarbons.

A variety of absorbent and adsorbsent materials for capturing hydrocarbons have also been developed. For example, U.S. Pub. No. 2013/0240451 A1 entitled APPARATUS AND METHODS FOR REMOVING CONTAMINANTS FROM A LIQUID by Curtis, Jr. et al., the disclosure of which is hereby incorporated herein by reference, discloses an open cell foam structure that can be used to adsorb oil from a body of water even when the oil is no longer highly concentrated at the surface of the body of water.

U.S. provisional patent application Ser. No. 61/987,600 filed on May 2, 2014 by LaCrosse et al. entitled SPILL REMOVAL METHOD AND SYSTEM, the disclosure of which is hereby incorporated herein by reference, discloses a system that provides for deploying oil-adsorbing blankets in a body of water to capture oil located in the water. LaCrosse et al., US 2015/0315760 A1, is the publication of a related application and the disclosure of this publication is also hereby incorporated herein by reference.

While many of the existing technologies are useful for remediating environmental contamination, further developments in this area remain desirable.

SUMMARY OF THE INVENTION

The present invention provides an apparatus and method for capturing a contaminant present in a body of water.

The invention comprises, in one form thereof, an apparatus for capturing contaminants in a water body having a bottom surface and defining a water column. The apparatus includes a liquid-permeable rigid platform structure and a collection media for capturing the contaminants. The collection media has a first end secured to the platform structure and a freely extending second buoyant end disposed opposite the first end. When the apparatus is disposed in the water column, the platform structure is configured to be positioned at a depth greater than the freely extending second buoyant end.

In some embodiments, the collection media is a buoyant material. For example, the collection media may take the form of a buoyant open cell foam. In alternative embodiments, the collection media may be a non-buoyant material with a float or other buoyant member secured to the structure and/or the free end of the collection media.

In some embodiments, the platform structure is a non-buoyant structure.

In some embodiments, the apparatus has a non-buoyant platform structure and further includes a rigid framework secured to the platform structure wherein the framework defines an opening spaced from the platform structure and the apparatus is configured such that, when the apparatus is disposed in the water column, the freely extending second buoyant end extends through the framework opening and the framework encircles the collection media.

In such an embodiment having a rigid framework, the platform structure and framework may include at least three attachment points wherein the attachment points define a horizontal spacing and a vertical spacing when the apparatus is positioned with the platform structure defining a horizontal plane. In some embodiments, the apparatus may include at least four attachment points with a first pair of the attachment points being positioned at a first height on the apparatus and spaced horizontally and a second pair of the attachment points being positioned at a second height on the apparatus and spaced horizontally. The attachment points allow a line to be secured to the apparatus whereby the apparatus can be towed behind a boat or other vessel. The use of a plurality of attachment points which are spaced both vertically and horizontally helps to stabilize the orientation of the structure in the water column as it is being towed by a vessel.

In those embodiments having a platform structure and a rigid framework, the platform structure and the framework advantageously define a rigid three dimensional structure and allow the flow of water therethrough. To promote the flow of water therethrough, the platform structure may include a perforated surface. Alternatively, the platform structure may be formed by an open framework. The three dimensional structure defined by the platform structure and framework is advantageously a six sided parallelepiped to facilitate the handling and storage of the apparatus.

In some embodiments, the collection media comprises a plurality of buoyant members having a substantially planar configuration and wherein the buoyant member defines a continuous material bridge along the weighted end with a plurality of freely extending fingers extending from the material bridge, the distal ends of the freely extending fingers defining the buoyant second end of the collection media.

In such an embodiment, the apparatus may further include a plurality clamping members for securing the first end of the buoyant members wherein the plurality of clamping members are secured to the platform structure with each of the plurality of clamping members being an elongate rigid clamping member configured to engage one of the buoyant members along the length of the first end of the buoyant member and the plurality of clamping members being secured to the platform in a parallel configuration.

Some embodiments of the apparatus may also include a fin secured to the apparatus wherein the fin is configured to generate a vertical force on the apparatus when the apparatus is towed behind a water vessel.

The invention comprises, in another form thereof, a method of remediating a body of water, wherein the method includes placing a collection media in the body of water wherein the collection media includes a first end and an opposite second end and captures contaminants present in the water. The method also includes positioning the collection media in the water body wherein the first end of the collection media is below the second end of the collection media and selectively positioning the collection media in the water column at a desired height.

In some embodiments, the method further includes towing the collection media. The method may also include attaching the first end of the collection media to a non-floating structure wherein the collection media is buoyant and supports the structure in the water body above the bottom.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 8 is a front view of the collection media and an attachment member.

FIG. 9 is a side view of the collection media.

FIG. 10 is a schematic front view of an alternative collection media and clamping member.

FIG. 11 is a partial exploded schematic view of the clamping member and collection media.

Figure 1:
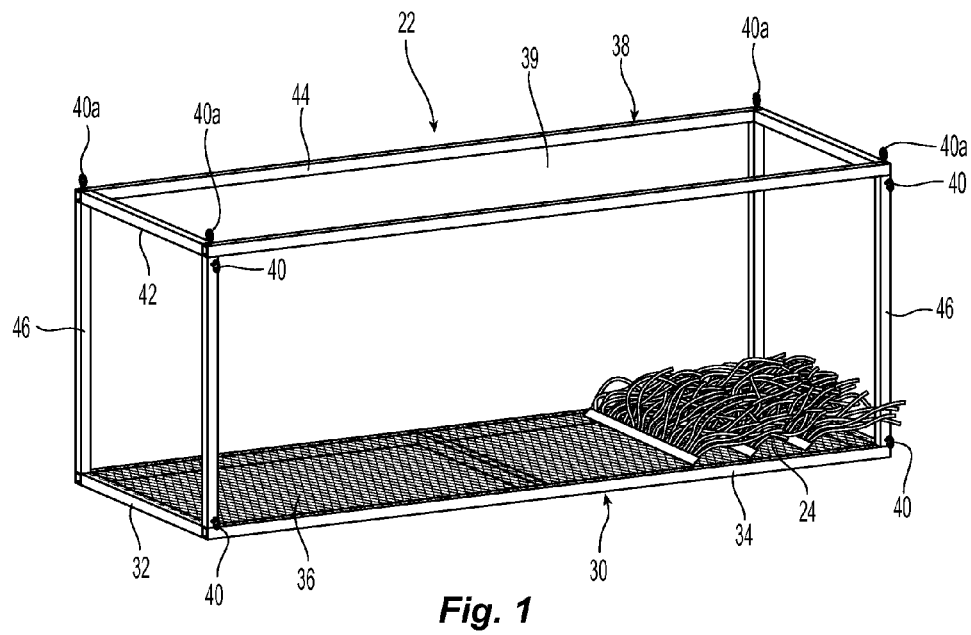
FIG. 1 is an image showing a remediation apparatus before the apparatus is placed in a body of water.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 12:
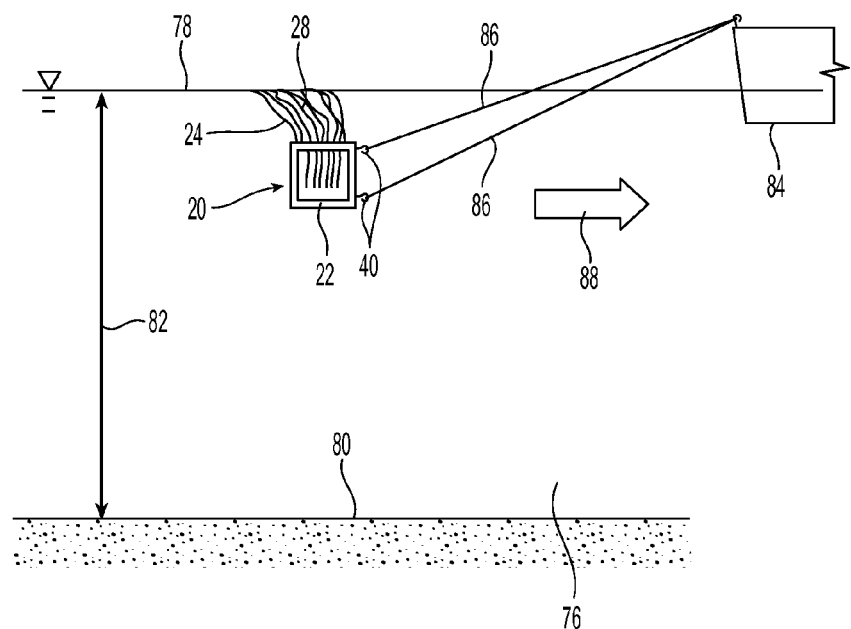
FIG. 12 a schematic view showing the remediation apparatus in use.

Remediation apparatus 20 is best seen in FIGS. 1 and 12. Apparatus 20 includes a structure 22 and a plurality of collection media 24. The collection media or collection matrix 24 are used to capture contaminants that are present in a body of water. The collection media have a first end 26 that is secured to structure 22 and an opposite second end 28 disposed opposite first end 26.

Advantageously, collection media 24 is formed out of a buoyant material. In the illustrated embodiment, collection media 24 is formed out of a buoyant open cell foam material that selectively absorbs/adsorbs hydrocarbon contaminants. Opflex Technologies, LLC headquartered in Indianapolis, Ind., manufactures a product that is commercially available under the name eelgrass mop that can be used to form collection media 24. U.S. Pub. No. 2013/0240451 A1, published Sep. 19, 2013, the disclosure of which is incorporated herein by reference, describes a similar open-cell foam material that can be used to form collection media 24. Other suitable materials may also be used to form collection media 24.

The illustrated structure 22 is formed out of steel tubing having a square cross section. In the illustrated embodiment, the steel tubing is welded together to form a cage for collection media 24. Structure 22 includes a platform structure 30 that is the bottom layer of structure 22. Platform structure 30 has a pair of short members 32 and a pair of long members 34 welded together to form a rectangle. Another short member 32a is located midway between the outer short members 32 for additional strength. A perforated surface 36 which, in the illustrated embodiment, takes the form of an expanded metal sheet is welded to the platform structure 30. The perforations in sheet 36 allow for the flow of water therethrough and also facilitate the attachment of collection media 24. While the illustrated expanded metal sheet results in a liquid permeable rigid platform 30, alternative embodiments could utilize a different perforated surface structure such as a sheet metal layer having openings therein or utilize a bare framework and omit the perforated surface and still provide a liquid-permeable rigid platform structure to which the collection media could be secured. It is noted that such an open framework platform may consist of short members 32, 32a and long members 34 secured together in the configuration depicted in FIGS. 1, 2 and 5-7.

A rigid framework 38 forms the upper layer of structure 22 is defined by a pair of short members 42 and a pair of long members 44 defining an opening 39 and also includes vertical members 46. In the illustrated embodiment, members 42, 44 define a rectangle having substantially the same dimensions as platform structure 30. In the illustrated embodiment platform structure 30 also forms the bottom layer of structure 22, however, it does not necessarily have to be the lowermost portion of structure 22. Similarly, in the illustrated embodiment, rigid framework 38 forms the uppermost layer of structure 22 but does not necessarily have to be the uppermost portion of structure 22.

Four vertical members 46 disposed at the corners of structure 22 are used to secure the bottom and top layers of structure 22. Although structural members 32, 32a, 34, 42, 44 and 46 are formed out of steel tubing in the illustrated embodiment, alternative materials may also be employed when forming structure 22. Moreover, structure 22 is not limited to the illustrated configuration and may have alternative shapes and configurations.

Figure 2:
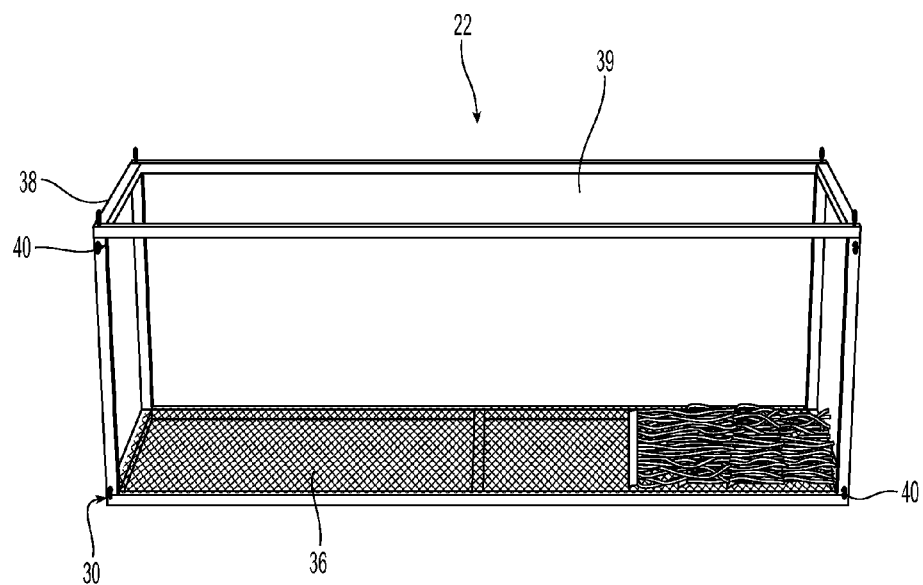
FIG. 2 is a front view of the remediation apparatus with only some of the collection media attached thereto.
Figure 3:
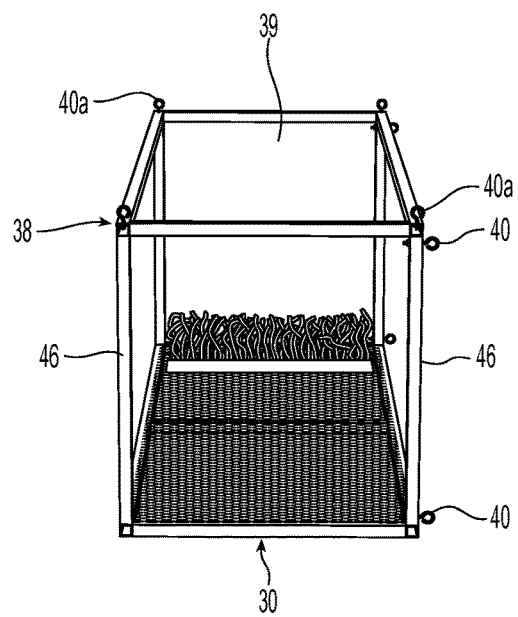
FIG. 3 is a side view of the remediation apparatus with only some of the collection media attached thereto.
Figure 4:
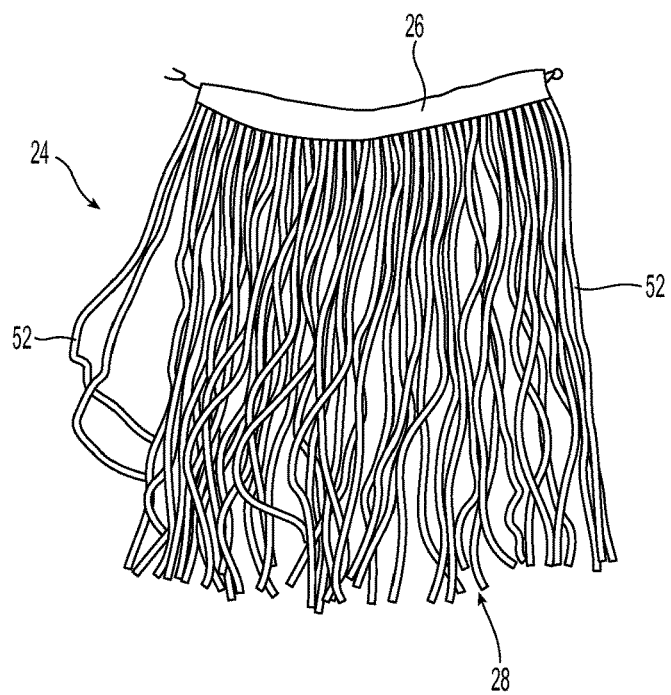
FIG. 4 is a view of one of the collection media.
Figure 5:
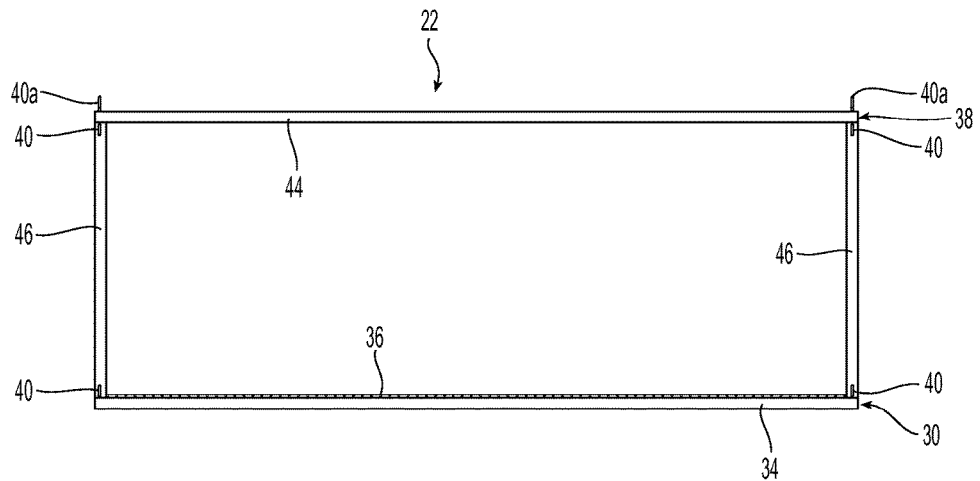
FIG. 5 is a front view of the weighted structure.
Figure 6:
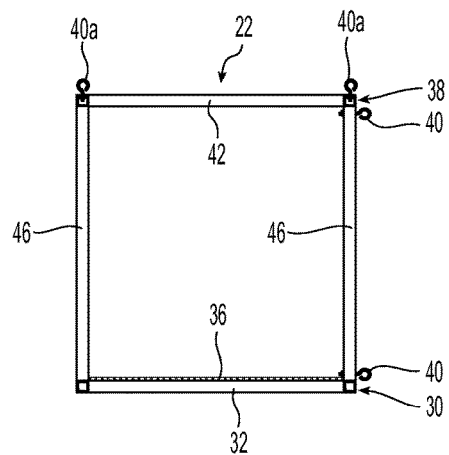
FIG. 6 is a side view of the weighted structure.
Figure 7:
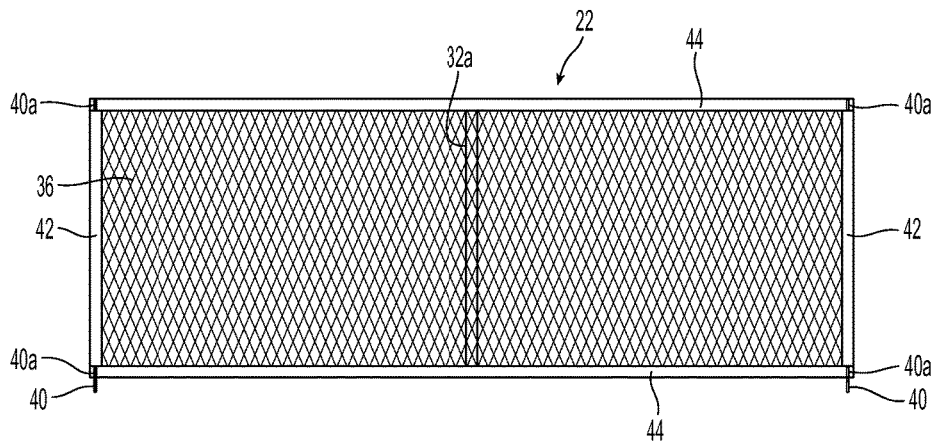
FIG. 7 is a top view of the weighted structure.
Figure 17:
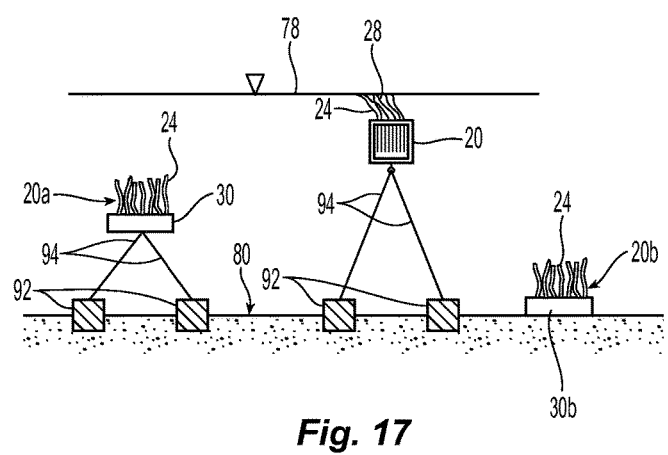
FIG. 17 is a schematic representation showing an apparatus being used in a stationary application.

With regard to FIG. 1, it is noted that this figure does not show all of the collection media 24 that would typically be secured to apparatus 20. Generally, it will be desirable for the collection media 24 to be secured along the full length of platform 30. In FIGS. 1-3, only a few of the collection media 24 are shown and the remainder has been omitted to provide a better view of the structure 22. It is also noted that length of collection media will generally be sufficient for the collection media to extend through opening 39 in the upper layer of structure 22. FIGS. 1-3 do not necessarily show the length of collection media 24 in proper proportions to structure 22. FIGS. 12 and 17 better represent how collection media 24 will typically extend through opening 39.

A plurality of eyebolts are secured to structure 22 to form attachment points 40, 40a. In the illustrated embodiment, four eyebolts are attached on the forward facing side of structure 22 to facilitate the towing of apparatus 20 by a boat or other vessel as further discussed below. An additional four eyebolts 40a extend upwardly from structure 22 proximate the four corners of top layer 38 and facilitate the handling of apparatus 20. For example, lines from a crane or other similar piece of heavy equipment could be attached to eyebolts 40a to lift and move apparatus 20.

Collection media 24 is shown in greater detail in FIGS. 8 and 9. The illustrated collection media 24 is formed out of a substantially planar open-cell foam blanket that a continuous material bridge 48 extending along first end 26. A series of slits 50 are cut into the foam material to define freely extending fingers 52. Cutting the foam material into fingers 52 increases the surface area of the foam available to capture contaminants in the water.

A portion 54 of the material bridge 48 is folded over onto itself to form a linear pocket 56. The folded over portion 54 is secured to the foam of material bridge 48 using ultrasonic welding, adhesives, stitching or other suitable method. A wire cable, polymeric rope or other suitable elongate tensile member 58 is positioned in pocket 56. In the illustrated embodiment, hooks 60 are secured at the end of a wire cable 58 to provide for the attachment of collection media 24. Hooks 60 are then engaged with expanded metal sheet 36 to secure collection media 24 to structure 22.

While the use of a tensile member 58 to secure collection media 24 is effective, it does allow the lower edge 26 of collection media 24 to assume a curved shape when apparatus 20 is disposed in the water with the center of lower edge 26 being higher than the ends where tensile member 58 is secured to structure 22.

FIGS. 10 and 11 illustrate an alternative embodiment which uses a different method securing collection media 24 to structure 22. The collection media 24a illustrated in FIGS. 10 and 11 does not include the folded over portion 54 and pocket 56 shown in FIG. 9 but is otherwise identical to collection media 24. Instead of using a tensile member 58, an elongate rigid clamping member 62 is used to secure collection media 24a along the entire length of first end 26. The clamping member 62 includes a pivot pin 64 and two clamp arms 66, 68. A nut and bolt assembly 70 is inserted through apertures 72 and is used to secure the arms 66, 68 together and clamp collection media 24a therebetween.

In this embodiment, structure 22 does not include an expanded metal sheet 36 on platform structure 30 and pivot pin 64 of each of the clamping members 62 extends between the long member 34 of platform structure 30 as depicted in FIG. 10. Clamping arms 66, 68 have alternating portions with bore holes that receive pivot pin 64 in the same manner that the matching components of a door hinge receive a pivot pin. The opposite end of the clamping arms 66, 68 may include alternating rib portions 74 that project into the foam of collecting media 24a to firmly secure collection media 24a in clamping member 62. Various other linear clamping members and other means of securing collection media 24 to structure 22 may also be employed. One advantage provided by clamping assembly 62 is that it engages collection media 24 continuously along first edge 26 for the entire length of first edge 26 and thereby prevents the upward curving of first edge 26 when in use. The use of tensile members 58 may also present handling difficulties due to tangling and the flexible nature of tensile members 58. The use of an elongate rigid clamping assembly to secure lower edge 26 of collection media 24 reduces such difficulties in attaching the collection media to structure 22.

Figure 13:
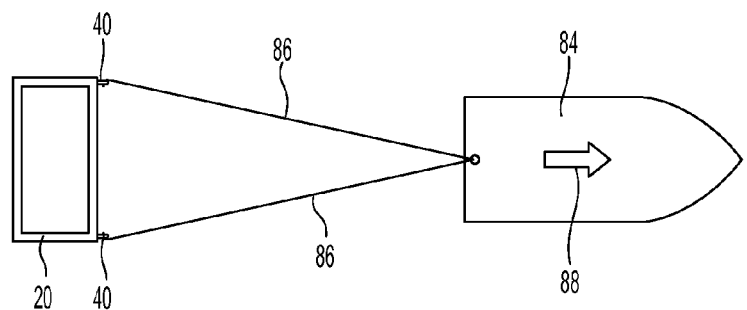
FIG. 13 is a top schematic view showing the remediation apparatus in use.

FIGS. 12-15 and 17 schematically depict exemplary methods by which apparatus 20 can be used to remediate a body of water 76. FIGS. 12 and 13 depict a vessel 86, such as a boat, towing a single apparatus 20 through a water body 76. As collection media 24 comes into contact with contaminants in the water body 76, the contaminants will be captured on collection media by absorption or adsorption and subsequently removed from water body 76. Vessel 84 may travel in a pattern to cover the area of concern in which the contaminants are located. Depending on the circumstances, a single pass or multiple passes may be made to recover contaminants. Generally, multiple passes will be required.

As can be seen in FIG. 12, water body 76 has an upper surface 78 and a bottom 80. Line 82 represents the height of the water column defined by water body 76. Tow lines 86 are attached to the four forward facing attachment points 40 of apparatus 20 to thereby allow vessel 84 to tow apparatus 20. Arrow 88 indicates the direction of travel. The use of four connection points 40 wherein a first pair are located at a first depth in water column, i.e., the attachment points proximate upper layer 38, and a second pair are located at a second depth in the water column, i.e., the attachment points proximate platform structure 30, with the attachment points of each pair being spaced horizontally apart, allows the apparatus 20 to be towed through the water while maintaining the apparatus in the desired orientation. This could also be achieved using a different configuration of attachment points, for example, the two bottom attachment points could be replaced by a single attachment point 40 located at the midpoint of the front lower member 34 whereby three attachment points would be used to two apparatus 20. Still other variations are also possible. In other words, it is desirable for apparatus 20 to include at least three attachment points 40 wherein the attachment points define a horizontal spacing and a vertical spacing. In the illustrated embodiment, there are four attachment points 40 with a first pair of the attachment points 40 being located at a first height proximate framework 38 near the upper end of structure 22. This first pair of attachment points are spaced horizontally being located on opposing vertical members 46 near opposite ends of frame member 44. A second pair of attachment points are located at a second height proximate platform structure 30 and, thus, are spaced vertically below the first pair of attachment points. This second pair of attachment points are also positioned on opposing vertical members 46 and are, thus, horizontally spaced from each other. As mentioned above, this vertical and horizontal spacing allows structure 22 to be towed through the water and still maintain the desired orientation. Structure 22 could alternatively or additionally be provided with stabilizer fins and or a keel to maintain the stability and desired orientation of structure 22 in the water column when apparatus 20 is being towed.

It is further noted that while eyebolts are used to provide the connection points in the illustrated embodiment, a variety of other connection methods can also be used to secure a tow line to structure 22 as will be recognized by those having ordinary skill in the art. Morever, the locations at which the tow lines are secured to apparatus 20 may also vary for alternative embodiments.

As can be seen in FIG. 12, when apparatus 20 has a height that is less than the depth of water column 82, the illustrated apparatus is positioned near the top of water column 82 proximate the upper surface 78 and spaced above bottom 80. This positions apparatus 20 at a location where the majority of the contaminants are likely to be soon after the occurrence of the event which caused the contaminants to enter the water body 76.

In this regard, it is noted that when apparatus 20 is being towed it is both the dynamic forces acting on apparatus 20 due to the movement indicated by arrow 88 and the overall buoyancy of apparatus 20 which will determine the position of apparatus 20 relative to the upper surface 78. The overall buoyancy is a primary factor in determining the location of the illustrated apparatus 20 in the water column when apparatus 20 being towed. The overall buoyancy is the determining factor when apparatus 20 is being used in a stationary application as depicted in FIG. 17. If apparatus 20 were provided with hydrofoil shaped fins, the dynamic forces acting on apparatus 20 during towing of apparatus 20 would become increasingly important and determinative of the position of apparatus 20 in the water column.

The overall buoyancy of apparatus is a factor of the buoyancy and weight of collection media 24 and structure 22. In the illustrated embodiment, collection media 24 is formed out of an open-cell foam that is a buoyant material. The illustrated structure 22 is formed out of steel tubing which is denser than water and will sink rather than float when placed in water. The quantity of collection media 24 attached to structure 22, however, is sufficient to generate a buoyancy force great enough to suspend structure 22 in the water column above the bottom 80. More specifically, it positions apparatus 20 proximate upper surface 78.

When collection media 24 is formed out of a buoyant material, it is desirable for the lower edge 26 of collection media to be attached to a structure that is non-floating and will weight the lower edge 26 down whereby the upper freely extending buoyant end 28 will be positioned proximate upper surface 78 and the lower end 26 will be positioned lower in the water column 82. This will allow collection media 24 to capture contaminants over a larger vertical extent of the water column than if the entire mass of the collection media 24 were allowed to float near the upper surface 78.

In this regard, it is noted that a platform structure 30 can be used to secure the lower ends 26 of collection media 24 and that positioning the platform structure 30 at a lower level within the water body will allow the upper ends 28 of collection media 24 to be positioned above lower ends 26. In the illustrated embodiment, this achieved by using a heavier than water platform structure 30 and a buoyant collection media 24, however, platform structure 30 could, alternatively, be a buoyant structure that is tied or otherwise coupled with an anchoring device and collection media 24 could be non-buoyant with a buoyant device secured to upper ends 28. It is also noted that while platform structure 30 is the lowermost part of illustrated structure 22, the platform to which collection media 24 is attached does not necessarily have to be the lowermost portion of structure 22 and various other forms of attachment platforms could be used with apparatus 20.

As discussed above, it will generally be desirable for apparatus 20 to be positioned at the upper surface 78 and extend downwardly therefrom as depicted in FIGS. 12 and 17. In some applications, it may be desirable for apparatus 20 to be positioned lower in the water column. In such cases, ballast, such as concrete blocks, can be secured to structure 22 to lower the apparatus 20 in the water column. Alternatively, the buoyancy of collection media 24 could be reduced by reducing the number of collecting media 24 attached to structure 22 or trimming the length of fingers 52. These methods of reducing the buoyancy will generally be undesirable, however, because they will also reduce the effectiveness of apparatus. Nevertheless, it may be the best option in some applications.

If the buoyant force exerted by collection media 24 is insufficient to maintain structure 22 at the desired height in water column 82, floats or other buoyant members can be attached directly to structure 22 or the distal ends of fingers 52 to provide the desired buoyancy. It is further noted that alternative forms of collection media may be used with apparatus 20. Floats can be used to provide the necessary buoyancy if the collection media is not a buoyant material. In such a situation, it will generally be desirable for at least some of the floats or other buoyant material to be attached to the distal free end 28 of the collection media to cause this end to float upwards away from the lower end 26. It is also noted that structure 22 could be formed out of a buoyant material and provided with ballast to weight the lower end 26 of the collection media. Still other modifications may be made to the apparatus 20 to control the position of the apparatus in the water column.

Figure 18:
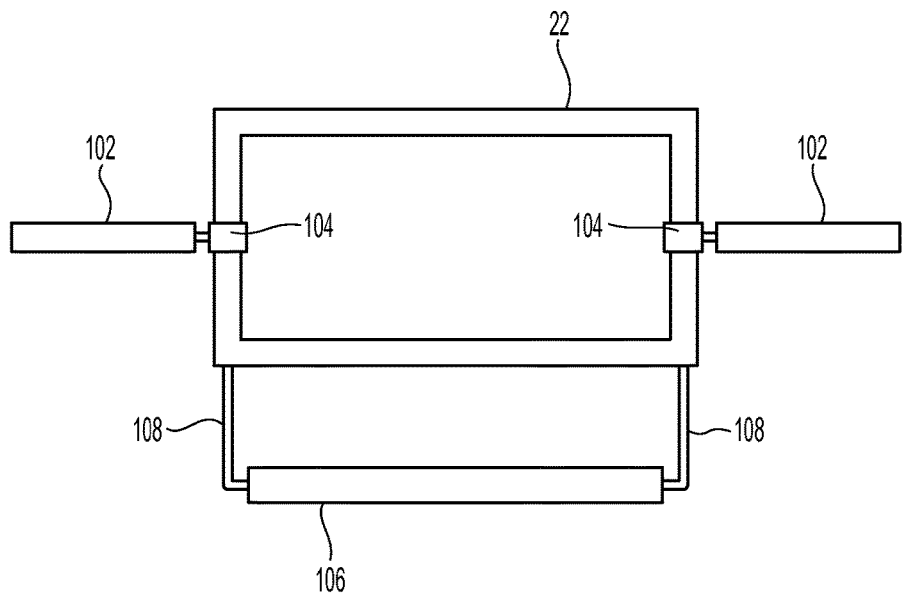
FIG. 18 is a schematic front view of an apparatus having attached fins.
Figure 19:
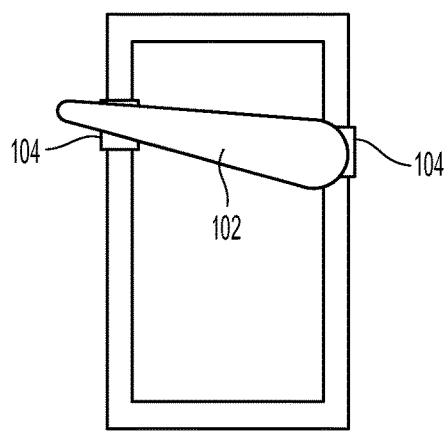
FIG. 19 is a schematic side view of an apparatus with an attached fin.

As mentioned above, by providing apparatus 20 with fins, the dynamic forces acting on apparatus 20 during towing of apparatus 20 would become increasingly important and determinative of the position of apparatus 20 in the water column. FIGS. 18 and 19 schematically depict the use of fins 102, 106 which are secured to apparatus 20 wherein the fins are configured to generate a vertical force on apparatus 20 when the apparatus is being towed.

FIG. 18 is a front view schematically depicting how fins 102 can be attached to structure 22 using brackets 104 and extend outwardly from the sides of structure 22. Brackets 104 can be secured to structure 22 either permanently, e.g., using welds, or, be removably attached, e.g., using nuts and bolts. Fin 106 depicts how a fin can be secured below structure 22 using attachment brackets 108. Although FIG. 18 illustrates both side fins 102 and a bottom fin 106, generally, it is also possible to use either side fins 102 or bottom fin 106 by themselves instead of together. FIG. 19 provides a schematic side view of fin 102. In the illustrated embodiment, fin 102 is arranged so that it will exert a downward vertical force on apparatus 20 when apparatus 20 is towed toward the right in FIG. 19. This would be desirable if it was desired to have apparatus 20 be located below the water surface when being towed. Alternatively, if the apparatus is insufficiently buoyant to be at the desired depth when being towed, fins 102 could be arranged differently to provide an upward vertical force on apparatus 20 and raise it within the water column.

In the illustrated embodiment, structure 22 has a length of approximately eight feet (2.44 m), a height of approximately four feet (1.22 m) and a width of approximately four feet (1.22 m). The distance between the opposing edges 26, 28 of collection media 24 is approximately six feet (1.83 m).

When placed in a body of water, approximately 5.5 feet (1.68 m) of the collection media 24 is submerged with the last six inches (0.15 m) floating on the upper surface 78 of the water. These dimensions are merely one example and other embodiments having different dimensions can be used. For example, it will often be desirable to have structures with a greater length than eight feet (2.44 m).

It is additionally noted that the illustrated structure 22 is a parallelepiped, i.e., a three-dimensional figure formed by six parallelograms, which in the illustrated example are six rectangles. Structure 22 has open sides to allow for the free flow of water through and resembles a cage with the four members forming top layer 38 encircling the upward extending fingers 52 of collection media 24. This arrangement confines and limits horizontal movement of fingers 52. This control over the movement of fingers 52 helps to ensure the fingers are positioned to efficiently capture contaminants located in the water through which apparatus 20 is towed.

While such a cage structure provides benefits, alternative embodiments may employ different structures for maintaining the lower edge 26 of collection media at a greater depth in the water column 82 than upper edge 28. For example, a weighted structure which does not extend upwardly of lower edge 26 could be employed in some applications. Such an arrangement would be particularly well adapted for a stationary application such as that depicted in FIG. 17 where maintaining fingers 52 in a controlled position during towing is not a concern.

Figure 14:
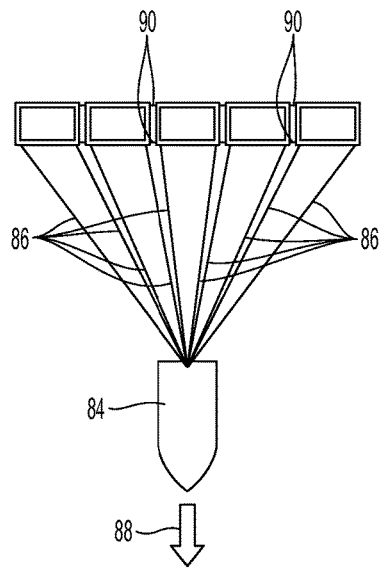
FIG. 14 is a top schematic view showing a plurality of remediation apparatus ganged together.

FIG. 14 illustrates the use of multiple apparatus 20 which have been secured together. In FIG. 14, bolted connections 90 have been used to secure five apparatus 20 together in a side-by-side arrangement. Brackets, chains, or other suitable connectors may also be used to secure the apparatus 20 together. The total assembly is then towed behind a vessel 84. Because the apparatus 20 are secured together, it may not be necessary for each of the apparatus 20 to have tow lines 86 connected thereto. In FIG. 14, only the outermost and center apparatus 20 have tow lines 86 secured thereto. This arrangement allows for a wider section of water to be covered in a single pass.

Figure 15:
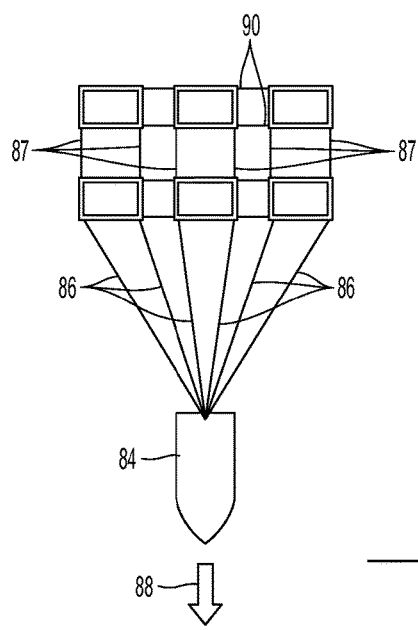
FIG. 15 is another top schematic view showing a plurality of remediation apparatus ganged together.

FIG. 15 illustrates another arrangement of apparatus 20. In this arrangement a second line of apparatus is towed behind a first line of apparatus. A series of rigid tow bars or flexible tow lines 87 are used to link the first and second lines of the apparatus. This arrangement provides for a more thorough sweeping of the water on each pass.

FIG. 17 illustrates a stationary application for apparatus 20. In this application, anchoring devices 92 are positioned on the bottom 80 of water body 76. Anchoring lines 94 secure apparatus 20 to anchoring devices 92 and prevent the wind and currents from transporting apparatus 20 from its desired location.

FIG. 17 also shows two alternative embodiments of apparatus 20. The first alternative, apparatus 20a, is similar to apparatus 20 but the structure of apparatus 20a is formed entirely by a platform structure 30 and does not include vertical members 46 or upper framework 38. As a whole, apparatus 20a is buoyant and is maintained at a desired height in the water column that is spaced from and below surface 78 and spaced from and above bottom 80. In the illustrated embodiment, apparatus 20a is maintained in this mid-height position with anchors 92 and anchor lines 94.

Another embodiment, apparatus 20b, depicted in FIG. 17 is positioned on bottom 80 of water body 76. This embodiment employs a simple platform similar to apparatus 20a that does not form a cage for collection media 24. Structure 30b, however, is positioned on bottom 80 instead of mid-height in the water column. Structure 30b may be maintained on bottom 80 by either providing structure 30b with sufficient weight to overcome the buoyant force of collection media 24 or by other anchoring means. FIG. 17 illustrates how the apparatus can be used to position the collection media in the water column at a desired height. This will allow the apparatus to be positioned at the height in the water column which is most conducive to capturing contaminants in water body 76.

Rigid framework 38 is most useful when apparatus 20 is being towed and can often be omitted when the apparatus is intended for use in a stationary application. When apparatus 20 is being towed, the upper freely extending ends 28 of collection media 24 will tend to be swept horizontally backward due to the movement of apparatus 20. By having the freely extending buoyant ends 28 extend through opening 39 defined by framework 38 such that framework 38 encircles the collection media 24, the collection media 24 is maintained in a more vertically upright position and thereby intersects a greater vertical length of the water column as apparatus 20 is being towed.

Figure 16:
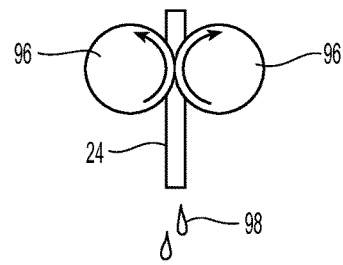
FIG. 16 is a schematic representation showing the reclaiming of contaminants captured by the collection media.
Figure 16:
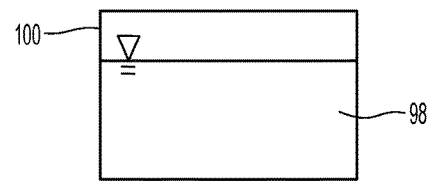

FIG. 16 schematically depicts the reclamation of contaminants, e.g., liquid hydrocarbons, captured by collection media 24. By running collection media 24 between two rollers 96 or other suitable members, the contaminants 98 captured by collection media 24 are forced out and can be collected in a collection tank 100. In some applications, the contaminants will be disposed in an appropriate manner. In other applications, the collected contaminants can be recycled for use. It is likely that some water will also be collected in tank 100 and some further processing of the collected liquid 98 to remove excess water will be necessary before it can be reused.

While this invention has been described as having an exemplary design, the present invention may be further modified within the spirit and scope of this disclosure. This application is therefore intended to cover any variations, uses, or adaptations of the invention using its general principles.

What is claimed is:

1. A remediation apparatus for capturing contaminants in a body of water having a bottom surface and defining a water column, the apparatus comprising:
    a liquid-permeable rigid platform structure wherein the platform structure is a non-buoyant structure;
    a collection media for capturing the contaminants, the collection media having a first end secured to the platform structure and a freely extending second buoyant end disposed opposite the first end;
    wherein, when the apparatus is disposed in the water column, the platform structure is configured to be positioned at a depth greater than the freely extending second buoyant end; and
    a rigid framework secured to the platform structure, the framework defining an opening spaced from the platform structure wherein the apparatus is configured such that, when the apparatus is disposed in the water column, the freely extending second buoyant end extends through the framework opening and the framework encircles the collection media.

2. The apparatus of claim 1 wherein the collection media is a buoyant material.

3. The apparatus of claim 2 wherein the collection media is an open cell foam.

4. The apparatus of claim 1 wherein the platform structure and framework define at least three attachment points, the attachment points defining a horizontal spacing and a vertical spacing when the apparatus is positioned with the platform structure defining a horizontal plane.

5. The apparatus of claim 4 wherein the apparatus defines at least four attachment points, a first pair of the attachment points being positioned at a first height on the apparatus and spaced horizontally, a second pair of the attachment points being positioned at a second height on the apparatus and spaced horizontally.

6. The apparatus of claim 1 wherein the platform structure and the framework define a rigid three dimensional structure and allow the flow of water therethrough.

7. The apparatus of claim 6 wherein the platform structure comprises a perforated surface.

8. The apparatus of claim 6 wherein the three dimensional structure is a six sided parallelepiped.

9. The apparatus of claim 1 wherein the collection media comprises a plurality of buoyant members having a substantially planar configuration and wherein each of the buoyant members defines a continuous material bridge along its first end with a plurality of freely extending fingers defining the second end.

10. The apparatus of claim 1 wherein the platform structure is an open framework.

11. A remediation apparatus for capturing contaminants in a body of water having a bottom surface and defining a water column, the apparatus comprising:
   a liquid-permeable rigid platform structure;
   a collection media for capturing the contaminants, the collection media having a first end secured to the platform structure and a freely extending second buoyant end disposed opposite the first end;
   wherein, when the apparatus is disposed in the water column, the platform structure is configured to be positioned at a depth greater than the freely extending second buoyant end wherein the collection media comprises a plurality of buoyant members having a substantially planar configuration and wherein each of the buoyant members defines a continuous material bridge along its first end with a plurality of freely extending fingers defining the second end; and
   a plurality of clamping members configured to secure the buoyant members, the plurality of clamping members being secured to the platform structure, each of the plurality of clamping members being an elongate rigid clamping member configured to engage one of the buoyant members along the length of the first end of the buoyant member, the plurality of clamping members being secured to the platform in a parallel configuration.

12. A remediation apparatus for capturing contaminants in a body of water having a bottom surface and defining a water column, the apparatus comprising:
   a liquid-permeable rigid platform structure;
   a collection media for capturing the contaminants, the collection media having a first end secured to the platform structure and a freely extending second buoyant end disposed opposite the first end;
   wherein, when the apparatus is disposed in the water column, the platform structure is configured to be positioned at a depth greater than the freely extending second buoyant end; and
   a fin secured to the apparatus, the fin configured to generate a vertical force on the apparatus when the apparatus is towed behind a water vessel.

* * * * *